Figure 1:
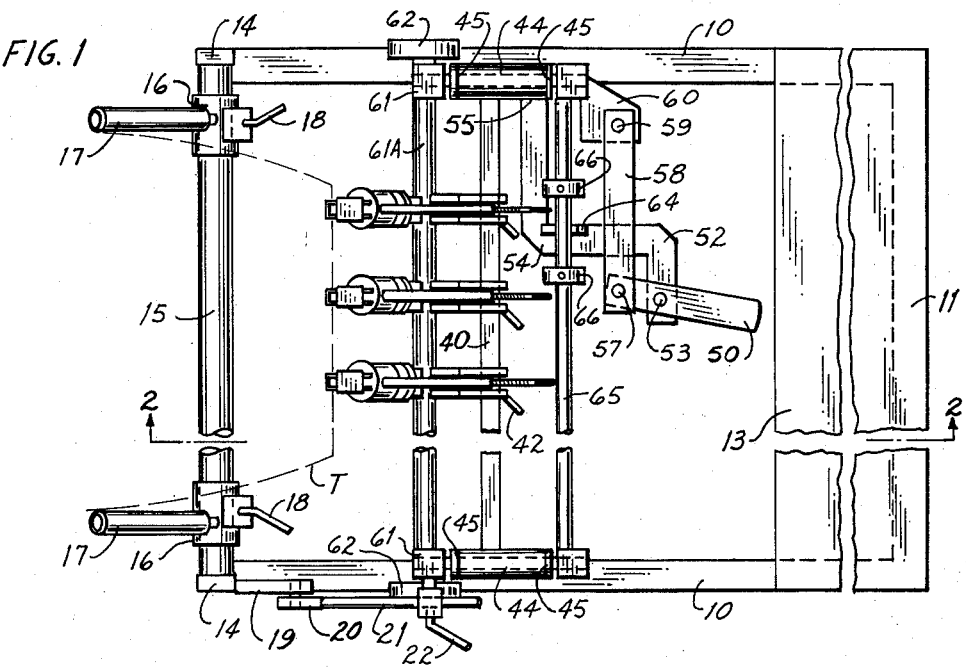

July 16, 1963

N. O. WOODARD 3,097,685

TIRE REGROOVING MACHINE

Filed May 24, 1960

2 Sheets-Sheet 1

Norman O. Woodard
INVENTOR.

BY *N. T. Sperry*
ATTORNEY

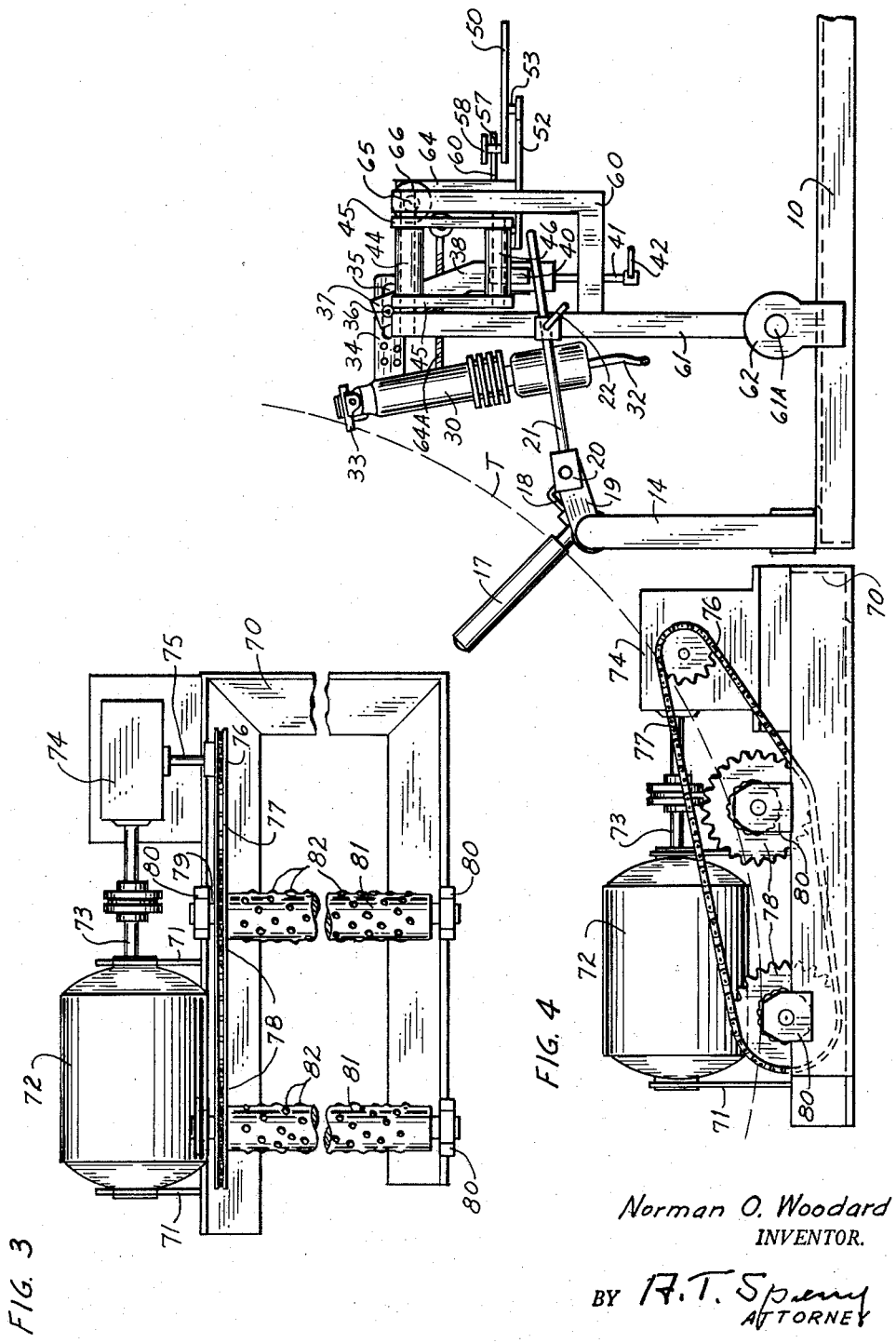

United States Patent Office 3,097,685
Patented July 16, 1963

3,097,685
TIRE REGROOVING MACHINE
Norman O. Woodard, 4611 W. Cayuga, Tampa, Fla.
Filed May 24, 1960, Ser. No. 31,436
2 Claims. (Cl. 157—13)

This invention relates to regrooving machines and while many aspects of the present inventive concept may be broadly applicable to various types of equipment for operations on a wide variety of tires or like structures, the invention is more particularly concerned with the grooving of large, heavy and cumbersome truck and tractor tires.

The regrooving of rubber tires to recreate a frictional tread surface has long been a common expedient. For light, easily handled passenger car tires it has been customary to jack up the vehicle, remove the tire and place it in a rotating device while the grooving tool is held against the tire and moved appropriately as the tire rotates to cut the desired groove design. While this is an appropriate operation for such light tires, it becomes a burdensome, time consuming and expensive task where heavy truck and tractor tires are involved. Removal of such heavy tires alone is costly and the handling of such tires is frequently so difficult as to require cranes and like handling equipment. Equipment has been designed in an attempt to provide for the regrooving of such heavy tires, without removal of the tire from the vehicle. However, such equipment has not been ideal, not only as to structure and design, but by virtue of the fact that only a single grooving tool is employed and hence the entire cycle of operation for any given tire requires repetition for each groove which is to be formed on the tire.

The present invention provides for the simultaneous multiple regrooving of large, cumbersome, truck and tractor tires, while such tires are in position on the vehicle. The invention further provides power means for rotating the tire independently of the vehicle wheel drive. In carrying out the invention multiple tools are provided together with a simple, effective and efficient structure for the mounting oscillation and feeding of the multiple grooving tools, as well as an improved means for the rotation of the tire during the regrooving operation. Improved simplicity of construction, efficient and effective operation and economy of manufacture, is provided by the present invention.

From the foregoing it will be seen that it is among the primary objects of the present invention to provide mechanism for the simultaneous formation of grooves in tire surfaces. A further object of the invention is to provide a novel and improved means for the grooving of tires while in their normal position on a vehicle. Another object is to provide a novel and improved means for rotating a tire while in a position on its vehicle and while subjected to a simultaneous multiple grooving operation. Other objects of the invention are to provide simplicity of construction, efficiency and effectiveness of operation, and economy of manufacture in a device of the character set forth. Numerous other objects, features and advantages will be apparent from consideration of the following specification taken in conjunction with the accompanying drawings, in which FIG. 1 is a top plane view of the regrooving apparatus of the present invention, FIG. 2 is a side elevation of that form of the invention presented in FIG. 1, FIG. 3 is a top plane view of the companion tire rotating device of the present invention, and FIG. 4 is a side elevation illustrating the joint operation of tire rotating mechanism of FIG. 3 and the grooving device of FIGURES 1 and 2.

Figure 2:
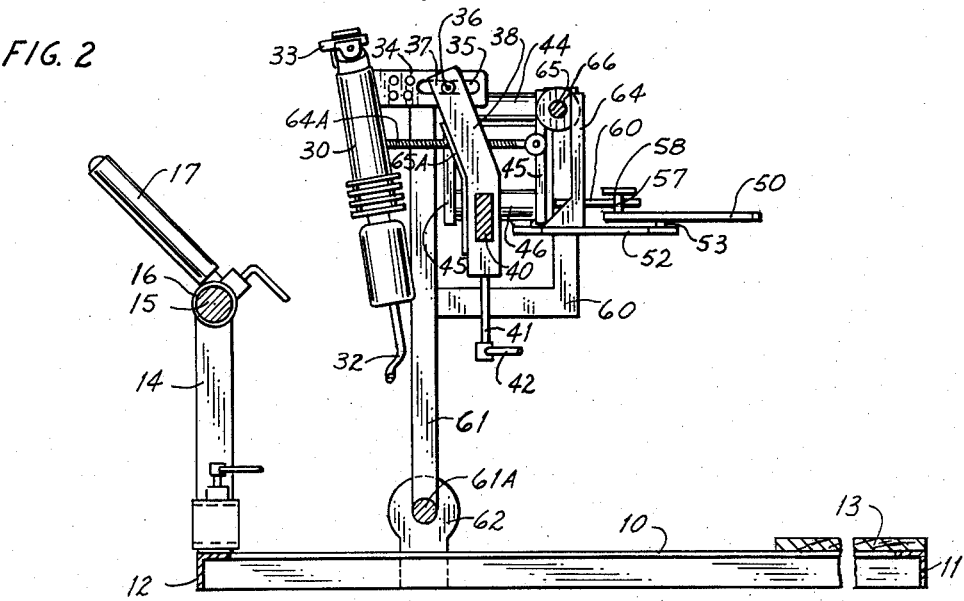

Referring more particularly to FIGURES 1 and 2 of the drawings, it will be seen that the form of the invention here shown by way of example, includes a base in the form of a skeletal horizontal platform formed of angle iron side rails 10, a rear angle iron end rail 11 and a parallel front rail 12, such structure lending itself admirably to welded fabrication. Across this frame adjacent the rear rail 11 there is provided a platform 13 to accommodate the operator in a seated position behind the grooving mechanism and facing the tire to be grooved. With respect to the platform structure, and with respect to the details of construction and design of the grooving mechanism about to be set forth, it will be understood that such details are exemplary. Obviously, such details do not constitute requirements of the inventive concept and may be widely varied to suit varying conditions and the dictates of the designer. Thus a radically different base, or one formed of different material and assembled in a different manner, may be provided and in like manner the related tire rotating mechanism may be formed in a radically different manner and with different materials than here illustrated, and yet conform to the present invention.

Mounted at the front of the base, preferably between uprights 14 on the front rail 12, there is provided a fixed horizontal shaft 15 arranged in vertical spaced relation above the rail 12. The shaft 15 has provided thereon slidable collars 16, supporting forwardly extending tire guide arms 17. By loosening securing screws by rotation of the handles 18 the collars 16 may be transversely adjusted along the shaft 15 to engage the sides of the tire indicated by the dotted lines T in FIG. 1. Preferably the arms 17 are rotatably mounted so as to guide the tire with minimum friction. For securing a frame structure (hereinafter to be discussed in detail) in fixed position a rigid arm 19 is fixed to one of the uprights 14. At 20 there is pivoted to the arm 19 a rod 21 releasably secured to the frame structure by a set screw 22.

The tire grooving tools of the present device are of generally conventional form, consisting of a body 30 inclosing a heating mechanism supplied by energy through cables 32 and with a generally U-shaped cutter element 33. Since these grooving instruments are of themselves conventional and commercially available, and well-known to those skilled in the art, their details of construction are not here depicted. As distinct from conventional manually manipulated cutters of this type however, the present cutters are provided with the rigidly mounted rearwardly extended supporting bracket 34, formed with an elongate slot 35 adapted to receive therethrough an Allen head bolt 36 which secures the arm 34 in fixed position between the furcated ends 37 of actuating bars 38 mounted upon a reciprocating driver 40. The bars 38 are longitudinally adjustable along the driver 40 to be secured in adjusted position by vertically extending set screws 41, the handles 42 of which permit release of the bars from the driver to accommodate transverse adjustment and securement of the bars after such adjustment. By use of the Allen head screws which tighten the furcated bars against the arms 34 close proximity of the cutter may be arranged. Thus the adjustment of the cutter may be as desired for close arrangement or wide spread position. With the three grooving heads here shown, it will be seen that three simultaneous grooves may be formed in any spaced relation desired.

The driver 40 constitutes a linking member of a pivoted carriage including opposed parallel pairs of trunnions 44 journaled in a frame 60 from each of which there depends a parallel pair of arms 45, joined at the bottom with similar trunnions 46 between which the driver 40 extends and to which it is secured. Thus the trunnion arrangement constitutes a pivoted parallelogram to which the driver is secured for rocking the carriage transversely of the tire surface while the frame may be oscillated to bring cutters into operative position. By this arrangement, it will be seen that manipulation of the carriage by which the arms 45 are oscillated with the trunnions 44 as their axes, the driver 40 will be reciprocated, thus reciprocating the cutter heads for transverse movement with respect to the tire being moved. Thus as the tire is rotated the transverse movement of the cutter will produce a zig-zag or curving line of groovings. It will of course be understood that by adjustment of the tire rotation with the movement of the driver a multiplicity of grooving patterns may be formed on the tire.

For reciprocating the driver through movement of the carriage, a manual operating handle 50 is provided pivotally engaging an arm 52 at 53 which arm extends inwardly with a right angle turn at 54 whereby its end 55 may engage the one of the lower trunnions 46 to which it is welded. The arm 50 is also pivotally engaged at 57 with a link 58, pivotally secured as at 59 with the relatively fixed frame 60, which supports the upper trunnion 44. The frame 60 is mounted on uprights 61 for oscillatory movement in a plane normal to the oscillatory movement of the carriage through pivotal connection 61A thereof, with bosses 62 supported on the side rails 10 of the base. For limiting the oscillatory movement between adjustable fixed positions, the arm 52 is provided with an upstanding stop member 64 which encircles a stop rod 65 mounted on the frame 60. Transversely adjustable stop collars 66 are secured in selectively fixed positions on rods 65 and hence as the stop 64 travels with the oscillation of the carriage, the carriage movement is limited by the adjustable location of the stop 66.

From the foregoing it will be seen that the present in- in the operation of the device, a tire is located between the members 17 while the frame of the cutter carriage is pivotably retracted by pivotable movement about the pivotal connection 61A. When the tire is properly adjusted to the desired position, the carriage is tilted forwardly. When the cutters 33 are in the desired cutting position with respect to the peripheral surface of the tire, the tire may be rotated while the cutter heads are oscillated across the tire surface in such manner as desired through pivotal movement of the handle 50. It will be understood that the cutter heads may be removed and replaced, as well as adjusted, and hence the cutters need not be three in number but may be more or less as desired. Inadvertent pivotal movement of the cutter heads, with respect to the tire is precluded by individual adjusting screws 64A which pass through and threadedly engage individual support plates 65A mounted on each of the actuating bars 38 for oscillating movement with the carriage which may be longitudinally adjusted by rotation in their threaded connection with the plate 65A.

The apparatus for rotating the tire while it is engaged with the cutters to form the desired grooving, is illustrated in FIG. 3 and FIG. 4. This apparatus, forming part of the total invention, comprises a generally U-shaped base frame formed by welded angle irons 70, mounting brackets 71. Projecting outwardly from the frame is a drive motor 72, the drive shaft 73 of which is coupled to a reduction gear box 74, the output shaft 75 of which extends through the sides of the frame to engage its sprocket 76 whereby rotation of the motor produces the movement of a chain 77. From the sprocket 76 the chain 77 passes over the sprockets 78 mounted on shafts 79 rotatably supported in bearing blocks 80 arranged in parallel pairs on the opposite sides of the frame. On each of the shafts 79 there is provided a pair of tire driving rollers 81 each of which are formed with projecting knobs 82 to provide firm frictional grip on the periphery of the tire thus to impart rotation to the tire in response to energization of the motors 72.

When a tire has been dismounted from the vehicle, one of a number of standard tire racks may be used with the rotating mechanism. Where the wheel is still on the vehicle, the vehicle may be jacked up to permit the rotating mechanism to be placed thereunder. In any event where the tires can be rotated by the present rotating mechanism, the tire is placed against the rollers and the grooving mechanism is moved up to bring its arms 17 in bearing relation against the sides of the tire. The grooving frame is then rocked forwardly to bring the cutting tools against the periphery of the tire. The manipulation of the handle 50 oscillates the carriage to produce the desired type of grooving on the tire.

From the foregoing it will be seen that the present invention provides for the simultaneous formation of a plurality of grooves on a vehicle tire, and is particularly designed for use with heavy duty truck and tractor tires to provide for the multiple grooving thereof without necessity of removal of the tire from the vehicle. It will be noted that although the grooving mechanism may be utilized for performance of grooving on tires while in place on the vehicle, the invention further provides for the grooving of tires dismounted from the vehicle and mounted on a conventional supporting rack. Rotation of such dismounted tire may be by the present rotating mechanism. It is to be understood that the device not only provides simplicity in construction, durability and economy of manufacture, but a wide adjustment of cutting heads and their scope of movement. While the details of construction are here shown as admirably adapted for the purpose, it will be understood that wide variation and choice of instrumentality are contemplated.

Therefore, in the practice of the invention numerous changes, modifications and the full use of equivalents may be resorted to without departure from the spirit or scope of the invention as outlined in the appended claims.

What I claim is:

1. A truck tire regrooving machine including a pair of separate bases adapted to be located on opposite sides of a truck tire while such tire is mounted on a truck, tire rotating means on one of said bases and multiple tire grooving tools mounted on the other of said bases, said tools being mounted for oscillatory movement toward and from a tire and for pivoted transverse movement across the face of a tire.

2. A truck tire regrooving machine including a pair of separate bases adapted to be located on opposite sides of a truck tire while such tire is mounted on a truck, tire rotating means on one of said bases and multiple tire grooving tools mounted on the other of said bases, said tools being mounted for oscillatory movement toward and from a tire and for pivoted transverse movement across the face of a tire, said tools being independently adjustable to vary the spacing therebetween.

References Cited in the file of this patent
UNITED STATES PATENTS

| | | |
|---|---|---|
| 1,486,474 | Baker | Mar. 11, 1924 |
| 1,567,472 | Skiles | Dec. 29, 1925 |
| 1,624,913 | Ames | Apr. 19, 1927 |
| 2,000,129 | Dunnam | May 7, 1935 |
| 2,000,300 | Scruby | May 7, 1935 |
| 2,178,665 | Janowski | Nov. 7, 1939 |
| 2,262,596 | Watkins | Nov. 11, 1941 |
| 2,578,997 | Errig et al. | Dec. 18, 1951 |
| 2,919,749 | Love | Jan. 5, 1960 |